May 28, 1957     E. R. MORELAND     2,793,706
SAFETY CONTROL FOR AUTOMOBILES
Filed June 20, 1955
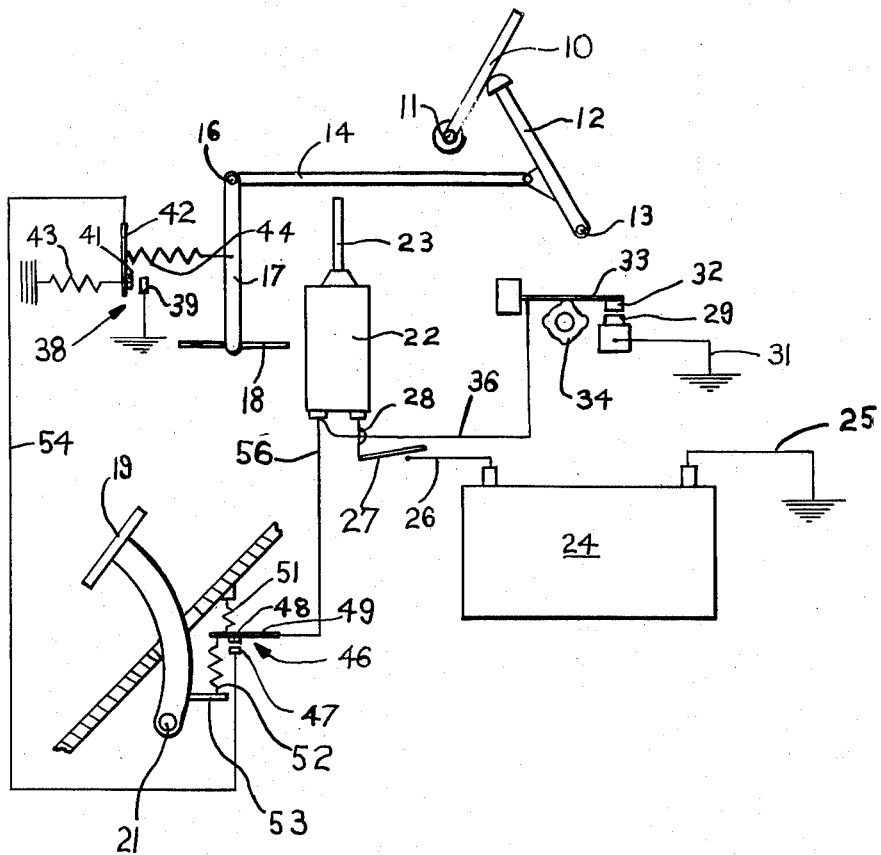
INVENTOR.
Edward R. Moreland
BY
*Jennings & Carter*
Attorneys

__# 2,793,706

SAFETY CONTROL FOR AUTOMOBILES

Edward R. Moreland, Birmingham, Ala.

Application June 20, 1955, Serial No. 516,606

5 Claims. (Cl. 180—82)

My invention relates to a safety control for automobiles and the like.

Heretofore, many serious accidents have been caused by the fact that the accelerator control rods, pedals, levers and the like on automobiles sometimes become jammed with the throttle in open position. It often happens under these conditions that the operator of the vehicle is panicked by this occurrence to such an extent that he fails to realize that the automobile could be stopped simply by opening the usual manual ignition switch. With modern fluid drive clutchless automobiles this problem becomes more acute and many serious and fatal accidents have occurred due to this failure of the parts of the throttle mechanism. Ordinarily, regardless of the state of panic of the operator, his first impulse is to apply the brakes of the automobile in an effort to stop it. However, with modern powerful automobiles the brakes usually are ineffective to stall the engine, particularly if the engine is running at a high speed, which is permitted by the fluid drive, indirect power connection in the transmission system. Consequently, the application of the brakes of a runaway automobile is of little avail in stopping the forward motion of the same.

In view of the foregoing the prime object of my invention is to provide apparatus for association with the ignition system and the brake pedal of the automobile which shall be effective, at speeds above normal idling speeds of the engine, to render ineffective the ignition system of the automobile whenever the brakes are applied.

More specifically, my invention contemplates the association with control arm for the butterfly valve of the carburetor a normally open electric switch which is closed when the throttle is open. I associate with the brake pedal another normally open electric switch which is closed when the brake pedal is depressed. These switches are in series with each other and are in circuit with the ignition system of the automobile in such manner as to short circuit the ignition system when both switches are simultaneously closed. The first named switch is closed whenever the throttle is opened to a greater extent than an idle position. Therefore, the ignition system is readied for shorting whenever the engine is running at a speed greater than idling speed and the downward movement of the brake pedal is effective to close the final switch, completely to short circuit the ignition, causing the engine to come to a standstill.

Apparatus illustrating the features of my invention is shown in the single figure of the drawing which is a diagrammatic wiring diagram showing how my invention may be applied to existing automobiles without substantial change therein.

Referring now to the drawings for a better understanding of my invention I illustrate the throttle system in diagrammatic manner as comprising the ordinary accelerator pedal 10 which may be pivoted to a suitable part of the automobile floor, as at 11. The pedal may cause forward rocking motion of a rod 12 which is pivoted at 13 and which is effective to pull a rod 14. The rod 14 is pivotally connected as at 16 to the arm 17 which controls the butterfly valve 18 in the carburetor barrel.

The usual foot actuated brake pedal is indicated at 19, the same being pivoted in the ordinary manner as at 21.

The ignition system is illustrated in part as comprising the high tension coil 22 which has the usual high tension wire 23 leading therefrom. Current for the primary of the coil is supplied by a battery 24 through a lead 26 and through the usual ignition switch 27 ordinarily located on the instrument panel of the automobile, within reach of the operator. The opposite terminal of the battery is grounded to the automobile frame by a line 25. Switch 27 is connected by a lead 28 to one side of the primary of the high tension coil.

The breaker points for the ignition system comprises the stationary contact point 29 which is grounded through the line 31. The movable contact point 32 is mounted on the end of the usual arm 33 which may be actuated by the breaker point cam indicated diagrammatically at 34. The contact point 32 may be connected by a lead 36 to the other side of the primary of the high tension coil 22.

The foregoing parts illustrate in diagrammatic manner the usual throttle mechanism, brake, and ignition system of an automobile. My invention consists of means to short circuit the ignition system whenever the throttle system is opened to more than a predetermined idle position when the brake is applied. Mounted adjacent the butterfly control arm 17 is an electric switch indicated generally by the numeral 38. The switch 38 comprises a stationary contact 39 and a movable contact 41 mounted on the usual arm 42. Switch 38 is normally biased toward open position by a small spring 43. Arm 42 is connected to the throttle arm 17 by means of a spring 44. The switch 38 is so set that at normal idling speed of the engine the spring 43 holds the switch 38 open. However, when the throttle is opened past the idling speed position, switch 38 closes.

Mounted in suitable manner so as to be closed whenever the brake pedal 19 is moved downwardly is a second switch indicated generally by the numeral 46. This switch comprises a stationary contact 47 and a movable contact 48 mounted on a movable arm 49. The switch 46 also is normally biased toward open position by means of a spring 51 which is connected to the arm 49 in a manner understood. The arm 49 is connected through a spring 52 to bracket 53 on the brake pedal mechanism in such manner that when the pedal is depressed the switch 46 is closed.

The arm 42 and the stationary contact 47 are electrically connected by a wire 54. The side of the primary of the coil 22 leading to the arm 33 is connected to the arm 49 by means of a wire 56.

From the foregoing the method of constructing and using my improved safety device will be readily understood. With the system in place on the automobile as shown it will be apparent that upon closing the ignition switch 27 the engine may be started in the ordinary and usual way, it being possible to depress the accelerator pedal 10 thereby to open the butterfly valve 18 for the purpose of starting the engine. In idle position of the accelerator pedal and butterfly valve it will be seen that switch 38 remains open. With the brake pedal in normal up position it will be seen that switch 46 is opened by the spring 51. However, should the throttle system become jammed in a position beyond a set idle position it will be apparent that immediately upon applying the brakes through pedal 19 switch 46 closes. This will establish a circuit through the line 56, switch 46, line 54, switch 38, and thence to ground from switch 38. The completion of the circuit just described short circuits the circuit leading from the coil 22 to the breaker points, causing the engine to stop. Therefore, even if the operator becomes panicked due to the jamming of the throttle, application of the brakes will bring the automobile safely to a stop.

It will be apparent that the switches 38 and 46 may be placed in several positions relative to their associated parts. It will be clearly apparent to those skilled in the art that the switch 46, for instance, may be associated with the usual brake fluid pressure system in such manner as, for instance, where the ordinary stop light switch on modern cars is placed. Furthermore, instead of short circuiting the breaker points it will be apparent that other parts of the ignition system could with equal facility be short circuited thereby to obtain a system which is the equivalent of the one described in detail herein.

In actual practice my invention has proved to be very satisfactory and has proved to be a worthwhile safety feature, especially when applied to fluid drive, modern day high powered automobiles. It will be noted that the invention may be applied to an existing automobile without any substantial change in the parts of the automobile.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The combination with a self-propelled vehicle in which the prime mover thereof is capable of being de-energized by rendering inoperative an electric circuit associated therewith and wherein the vehicle is equipped with brakes and a throttle, of a first normally open electric switch operatively connected with and closeable by the throttle upon movement of the throttle past prime mover idling position, a second normally open electric switch operatively associated with the brakes and closeable by applying the brakes, and electric circuits connecting said switches in series with each other and in circuit with the electric circuit of the prime mover, whereby, when both of said switches are simultaneously closed the prime mover circuit is rendered inoperative.

2. The combination with a self-propelled vehicle powered by an internal combustion engine having an electrical ignition system and wherein the engine is equipped with a throttle and the vehicle is equipped with brakes, of an electric switch operatively connected with the throttle and closeable thereby upon opening the throttle more than a pre-determined amount, a second normally open electric switch operatively connected to and closeable upon setting of the vehicle brakes, and circuits connecting said switches in series with each other and jointly in short circuiting relation to the ignition system of the engine.

3. The combination with a vehicle having an internal combustion engine embodying an electrical ignition system and a manually operated throttle and wherein the vehicle is equipped with manually settable brakes, of a first normally open electric switch operatively connected with and closeable by the throttle upon movement of the throttle past engine idling position, a second normally open electric switch operatively connected to and closeable by setting the brakes of the vehicle, electric circuits connecting the switches in series with each other, and other electric circuits connecting the series connected switches in short circuiting relation relative to the engine ignition system.

4. The combination with a vehicle powered by an internal combustion engine having an electrical ignition system of the kind embodying a high tension coil and breaker points in circuit with the primary circuit of the high tension coil and wherein the vehicle is equipped with brakes and a throttle, of a first normally open electric switch operatively connected to the throttle and closeable by opening the throttle to a position beyond engine idling speed position, a second normally open electric switch operatively connected to the brakes and closeable by setting the brakes of the vehicle, an electric circuit connecting said switches in series with each other, and second electric circuits connecting the series connected switches to the primary of the high tension coil whereby, closing both of said switches simultaneously short circuits the primary of said high tension coil.

5. Apparatus as defined in claim 4 in which the said second electric circuit is connected to the terminal of said coil primary which is connected to the breaker points.

No references cited.